Oct. 24, 1939.   D. F. SMITH ET AL   2,176,981
METHOD OF COATING THE SURFACE OF WALLBOARD AND THE LIKE
Filed Dec. 10, 1936
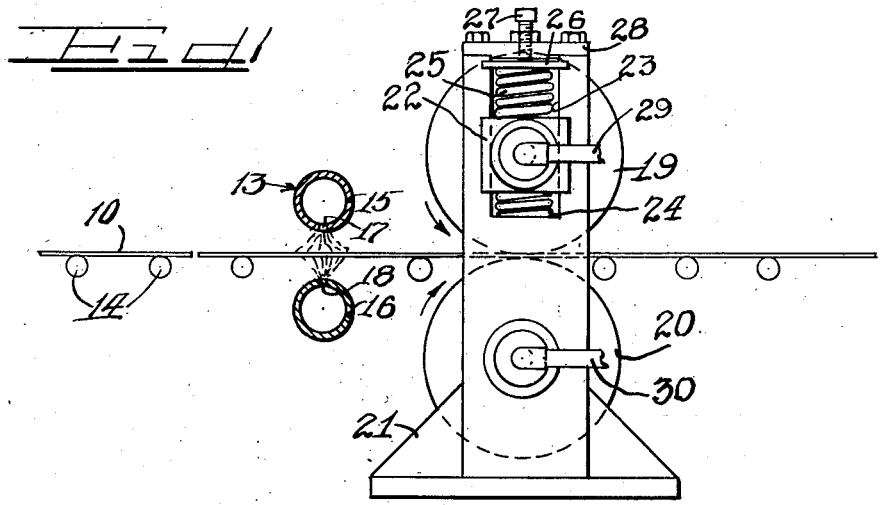
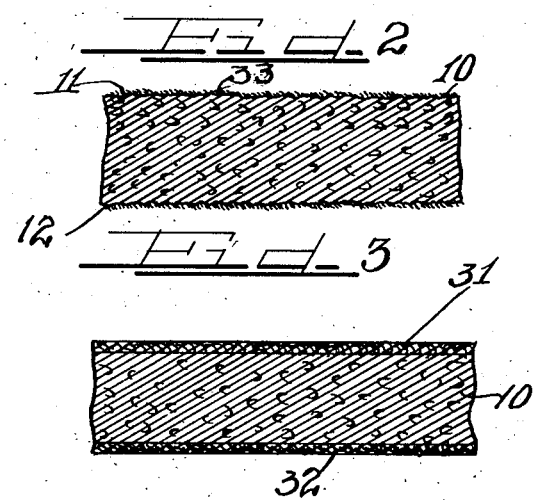
Inventors
Dillon F. Smith
Oscar T. Close Patented Oct. 24, 1939

2,176,981

UNITED STATES PATENT OFFICE 2,176,981

METHOD OF COATING THE SURFACE OF WALLBOARD AND THE LIKE

Dillon F. Smith and Oscar T. Close, Pensacola, Fla., assignors, by mesne assignments, to Armstrong Cork Company, Manheim Township, Lancaster County, Pa., a corporation of Pennsylvania Application December 10, 1936, Serial No. 115,120

6 Claims. (Cl. 91—68)

This invention relates to a method of improving the surface of wallboard and the like and more particularly to a method of providing wallboard with smooth, hard, coated surfaces of pleasing and artistic appearance.

In the manufacture of wallboard from spent chips, that is, Southern pine chips from which the resin has largely been extracted, the chips may suitably be processed in accordance with the method disclosed in the Smith et al. Patent No. 1,873,056, dated August 23, 1932. The board so obtained is of relatively porous structure and the surfaces thereof are rough and uneven. On account of the dark color of the board, it is often desirable to paint the board, but painting is unsatisfactory when carried out in the usual way, owing to the roughness of the surfaces and the great absorptiveness of the board. Sanding the board gives a smoother surface, but the surface is left more or less dusty and even more porous and difficult to paint.

We have now discovered that the surfaces of such fiber wallboard and other wallboards of similar character can be so treated as to render them smooth and hard without substantially increasing the density of the inner body of the board, thus retaining the heat insulating value of the wallboard.

In order to accomplish this and at the same time prevent the board from warping, both sides of the board are coated with an aqueous emulsion of casein and/or starch and sufficient heat and pressure applied simultaneously to the coated sides to dry, smooth and harden the surfaces superficially without substantially compacting the inner fibrous body of the board. The heat and pressure are preferably applied to the coated surfaces of the board by means of heated rolls which are revolved at a surface speed substantially the same as the speed of travel of the board through the rolls. By this means the surfaces of the board are toughened to such an extent that they are not easily scuffed or marred in handling or in service. Plasticizing and/or wetting agents may be used to secure a flexible and tough coating that is firmly bonded to the fibrous structure of the board.

It is therefore an important object of this invention to provide a method of making a smooth, hard surfaced wallboard of artistic appearance having good heat insulating properties by the application to both sides of a rough, porous textured fiberboard of a coating containing casein and/or starch, followed by the application of heat and light pressure simultaneously to opposite coated surfaces of the board to dry, smooth and harden such surfaces without substantially compacting the inner fibrous structure of the board.

Other and further important objects of this invention will become apparent from the following description and appended claims.

On the drawing, which illustrate a preferred form of apparatus for carrying out the method of our invention, Figure 1 is a side elevational view of apparatus suitable for carrying out our method;

Figure 2 is a fragmentary sectional view of untreated fiberboard; and

Figure 3 is a fragmentary sectional view of wallboard of our invention.

The reference numeral 10 indicates a strip or sheet of untreated board of a more or less loosely matted, open fibrous structure having rough surfaces 11 and 12. A board of this type may suitably be formed on a cylinder mold from pulp prepared from extracted Southern pine chips, as disclosed in the above-mentioned patent. The greater part of the resin content has been removed from such chips by solvent extraction, but a part of the resin remains in the pulp made therefrom, both in a free state and as a precipitated resinate. It will be understood, however, that the method of our invention is applicable to the manufacture of fiberboard from other raw sources of fibers, such as spruce, fir, cottonwood, willow, bagasse, corn stalks, wheat straw, licorice root and the like.

The fiberboard 10 in the form of sheets, is first passed between coating devices indicated generally by the reference numeral 13, by means of which an aqueous paint or emulsion is applied to both surfaces 11 and 12 of the fiberboard. A plurality of idler rolls 14 serve to support the sheets of fiberboard 10 during their travel.

In the specific embodiment illustrated, the coating device 13 comprises a pair of spray pipes 15 and 16 having oppositely disposed orifices 17 and 18 through which the coating solution is sprayed against the upper and lower surfaces 11 and 12, respectively, of the fiberboard. Other coating devices may be employed, including fountain or feed rolls, doctoring devices, or brushing mechanisms, or combinations thereof. The particular mode of application of the coating composition to the fiberboard is relatively unimpartant, but it is important that both sides of the fiberboard be coated, since otherwise warping of the board is likely to occur. The coatings on opposite sides may, of course, be of the same or different formulae. For instance, we find it very satisfactory to apply a casein paint to one side of the board and a starch emulsion to the other. Where one side is not to be exposed, or is to be subsequently painted, an uncolored, or unpigmented coating composition may be used.

After the coating has been applied to the fiberboard, the fiberboard is passed between upper and lower heated rolls 19 and 20, respectively, which rolls may suitably be supported in standards 21. Means are provided for applying light pressure through the roll surfaces to the fiberboard 10 and, as illustrated, include bearing blocks 22 in which the trunnions of the upper roll 19 are journaled and which bearing blocks are slidable in vertical guideways 23 formed in the standards 21. Springs 24 and 25 are mounted below and above the bearing blocks 23, respectively. The springs 24 are of sufficient compressive strength to support the dead weight of the roll 19, so that the pressure to be applied by the rolls 19 and 20 to the board can be varied from practically nothing up to the desired amount. Conventional mechanism for pressure adjustment is shown and comprises a bolt 27 threaded through a plate 28 secured to the top of each of the standards 21 and a slidable plate 26 carried by the lower end of each bolt and bearing against an upper spring 25. A heating medium, such as steam, or gas, is supplied to the interior of the rolls 19 and 20 through pipes 29 and 30, respectively.

One or both of the rolls 19 and 20 may be driven by suitable means (not shown) so that the surface speed of said rolls is substantially the same as the rate of travel and in the same direction as that of the board 10 between the rolls. The surfaces of said rolls are preferably smooth. The temperature to which the rolls 19 and 20 are heated should be sufficient to dry the coated surfaces rapidly without scorching the same and, in general, will be from any point above the boiling point of water up to, say, 700° F., depending upon the speed of travel of the board, the moisture content of the coating applied thereto and the number of passes of such heated rolls that may be employed. Only a single pass is shown, but more passes may be employed if desired.

Since the board 10 is practically dry prior to being coated, and since the coating composition is such that it does not penetrate deeply into the fiberboard, a single pass between the heated rollers 19 and 20 is sufficient, by proper regulation of the speed of travel of the board and of the temperature of the rolls, to dry and harden the coated surfaces. It is an important feature of our invention that the heat and pressure be simultaneously applied to substantially opposite portions of the coated surfaces, since thereby the surfaces are dried out more uniformly and there is less tendency of the board to become warped. The pressure applied to the board surfaces through these rolls 19 and 20 is relatively light, being sufficient to impart a smoothing action to the coated surfaces of the board without, however, substantially compacting the inner fibrous structure. The board after being coated thus retains practically its original heat insulating value.

As illustrated in Fig. 3, the board 10 acquires surface coatings 31 and 32 on both of its faces. These coatings 31 and 32 are relatively thin, being in the neighborhood of 30/1000 of an inch in thickness. The ingredients of the coating composition are so selected that the coatings applied will be flexible yet relatively hard and dense and firmly bonded to the surface fibers of the board, so that the coating cannot be easily broken loose and scuffed off in handling.

The coating compositions that we prefer to use comprise aqueous solutions or emulsions of binding agents, such as casein, starch, and vegetable and animal albumens, or mixtures of any two or more of these agents. Wetting agents, such as pine oil, sulfates of high molecular weight alcohols, alkali metal sulfonates of alkylated naphthalenes, or the like, are used, particularly where the board has been formed from pulp prepared from solvent extracted Southern pine chips. In that case, wetting agents are particularly helpful, because of the water resistance of the resin impregnated and sized fibers, in effecting penetration of the coating composition into the surface fibers of the board to thereby secure a firm bonding of the coating to the fibers.

Fillers, such as china clay, mica, and other siliceous or argillaceous materials, and pigments, such as lithopone, zinc oxide, whiting, titanium dioxide and the like, may be incorporated into the coating composition. Likewise, hardening and waterproofing agents, such as drying oils, rosins, waxes, formaldehyde, and others may be used to increase the hardness and waterproofness of the coating. Where pine oil is used as the wetting agent, it also serves as a preservative, but other preservatives, fungicides and the like, may be added to the coating composition.

The following examples will serve to illustrate preferred embodiments of our coating composition, parts by weight being given:

*Example 1:*

|  | Parts |
|---|---|
| Starch | 21 |
| Emulsifiable pine oil | 9 |
| Water | 350 |

*Example 2:*

|  | Parts |
|---|---|
| Starch | 7 |
| Casein | 24 |
| Aqueous ammonia 28% by volume | 9 |
| Emulsifiable pine oil | 3 |
| Water | 350 |

*Example 3:*

|  | Parts |
|---|---|
| Casein | 24 |
| Ammonia 28% by volume | 9 |
| Emulsifiable pine oil | 16 |
| Water soluble dye, such as sap brown | 16 |
| Water | 350 |

The foregoing formula is suitable for use for preparing colored surface finishes.

*Example 4:*

|  | Parts |
|---|---|
| Lithopone | 250 |
| Casein | 39 |
| Aqueous ammonia 28% by volume | 15 |
| Emulsifiable pine oil | 8 |
| Water | 350 |

This formula is suitable for preparing pigmented surface finishes.

*Example 5:*

|  | Parts |
|---|---|
| Lithopone | 250 |
| Raw sienna | 12.6 |
| Casein | 39 |
| Aqueous ammonia 28% by volume | 15 |
| Emulsifiable pine oil | 8 |
| Water | 350 |

*Example 6:*

| | Parts |
|---|---|
| Lithopone | 187.5 |
| China clay | 62.5 |
| Casein | 39 |
| Aqueous ammonia 28% by volume | 15 |
| Emulsifiable pine oil | 8 |
| Water | 350 |

*Example 7:*

| | Parts |
|---|---|
| Lithopone | 250 |
| Casein | 39 |
| Aqueous ammonia 28% by volume | 15 |
| Emulsifiable pine oil | 8 |
| Bodied linseed oil | 20 |
| Water | 350 |

The foregoing formula provides a waterproof pigmented surface finish.

*Example 8:*

| | Parts |
|---|---|
| Casein | 28 |
| Aqueous ammonia 28% by volume | 44 |
| Emulsifiable pine oil | 44 |
| Powdered rosin | 32 |
| Water | 350 |

The foregoing formula is suitable for producing a waterproof natural finish.

In order to impart fungicidal and insecticidal properties to the coating composition, from 0.1 to 1% by weight of the binder of a fungicide or insecticide may be added, depending upon the effectiveness of the compounds selected. For instance, in the formula of Example 4, ¾ of a part of zinc tetrachlor phenate may be added.

When using any of the foregoing coating compositions, the amount of penetration of the coating into the board is not great, being as previously indicated in the neighborhood of $30/1000$ of an inch. We have nevertheless found that the addition of a wetting agent, particularly where the fibers from which the board is formed are high in resin content, is necessary to secure this degree of penetration, since if no wetting agent is employed, the penetration is only about half as much and the resulting surface coating can be easily broken loose and scuffed off in handling. Where a wetting agent is employed, a tougher film is obtained which cannot be readily loosened, while at the same time the inner body of the fiberboard is left in an open, porous condition.

The change in surface characteristics of the board brought about by the coating operation is indicated in Figs. 2 and 3 of the drawing. Before coating, the surfaces of the board are rough and some of the fibers, indicated by the reference numeral 33, stick out at an angle from the board surface. During the coating step, these surface fibers are wet with the coating composition and become coated and impregnated therewith while in their up-ended positions. This action is aided by the presence of a wetting agent, such as pine oil, in the coating composition.

The heated rollers 19 and 20 lay down the fibers 33, compacting the surface fibers and causing them to adhere together by the binding action of the coating composition.

The formerly up-ended fibers thus become interlocked with the fibers of the body of the board to produce, when dried, relatively dense, smooth, hard surface layers 31 and 32, which are highly resistant to any scuffing action. The thickness of said surface layers is greatly exaggerated in the drawing for purposes of illustration.

It will be understood, of course, that other fillers, soluble dyes, pigments and the like may be used in place of the specific corresponding ingredients in the coating composition formulae given above. Also, in place of aqueous ammonia, other alkaline solutions for dissolving the casein may be employed. We find it preferable to use ammonia and to use an excess thereof to maintain the aqueous coating composition on the alkaline side. However, the heat applied to the coated surfaces in drying drives off most of this excess ammonia.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. The method of improving the surface of wallboard, which comprises surface coating both sides of a rough, porous-textured, fibrous board with an aqueous paint containing a binder and immediately thereafter subjecting said coated board simultaneously to heat and pressure to smooth and harden said surfaces before any substantial penetration of said coating can occur and without substantially compressing the body of said board.

2. The method of improving the surface of wallboard, which comprises surface coating both sides of a relatively porous, loose-textured fiberboard with an aqueous treating composition containing a binder and immediately thereafter subjecting said coated surfaces to the simultaneous application of heat and pressure to harden and compact said board surfaces superficially before any substantial penetration of said treating composition can occur and without substantially compacting the inner body of said board.

3. The method of improving the surface of wallboard, which comprises surface coating both sides of a relatively porous, loose-textured fiberboard with an aqueous treating composition containing casein, a filler and a wetting and preserving agent and immediately thereafter subjecting said coated surfaces to the simultaneous application of heat and pressure between smooth heated surfaces to harden and compact said board surfaces superficially before any substantial penetration of said treating composition can occur and without substantially compacting the inner body of said board.

4. The method of improving the surface of wallboard, which comprises surface coating both sides of a loose-textured board of fibrous material with an aqueous casein paint containing a filler, a pigment and a wetting and preserving agent and immediately thereafter passing said coated board while still wet between heated rolls having smooth surfaces revolving at the same surface speed as the surface speed of said board and in the same direction as the latter to dry and smooth the coated surfaces of said board before any substantial penetration of said paint can occur and without substantially compacting the inner body of said board.

5. The method of improving the surface of wallboard from a fibrous board of open, rough texture composed of well sized fibers prepared from extracted Southern pine chips, which method comprises applying an aqueous casein emulsion containing a wetting agent to both sides of said board to coat the surfaces thereof, immediately thereafter passing said coated board between heated rollers revolving at substantially the surface speed of travel of said board and in the same direction of the latter and applying heat and light pressure by means of said rollers to opposed coated surfaces of said board to dry, smooth and harden said surfaces superficially before any substantial penetration of said emulsion can occur and without substantially increasing the density of the inner body of said board.

6. The method of improving the surface of wallboard, which comprises coating opposite surfaces of a rough, porous-textured, fibrous board with different aqueous compositions, one containing starch and the other containing casein, and immediately thereafter subjecting opposed portions of said coated surfaces to a smoothing action and to heat to smooth and dry said surfaces before any substantial penetration of said coating composition can occur and without materially compacting the inner body of said board.

DILLON F. SMITH.
OSCAR T. CLOSE.